(12) United States Patent
Andrew et al.

(10) Patent No.: US 7,873,182 B2
(45) Date of Patent: Jan. 18, 2011

(54) MULTIPLE CAMERA IMAGING METHOD AND SYSTEM FOR DETECTING CONCEALED OBJECTS

(75) Inventors: Brian Andrew, Orlando, FL (US); John Carter, Gainesville, FL (US)

(73) Assignee: Brijot Imaging Systems, Inc., Lake Mary, FL (US)

( * ) Notice: Subject to any disclaimer, the term of this patent is extended or adjusted under 35 U.S.C. 154(b) by 832 days.

(21) Appl. No.: 11/835,905

(22) Filed: Aug. 8, 2007

(65) Prior Publication Data

US 2009/0041293 A1 Feb. 12, 2009

(51) Int. Cl.
*G06K 9/00* (2006.01)
*G06K 9/36* (2006.01)
*G01S 13/00* (2006.01)
*H04N 5/225* (2006.01)

(52) U.S. Cl. ................... 382/100; 382/284; 342/27; 342/195; 348/262

(58) Field of Classification Search ............... 382/100, 382/107, 284; 348/262; 250/330, 339.03, 250/339.06, 338.1; 342/22, 27, 82, 175, 342/176, 179, 191, 194, 196

See application file for complete search history.

(56) References Cited

U.S. PATENT DOCUMENTS

| 6,501,414 | B2 * | 12/2002 | Arndt et al. ................. 342/22 |
| 6,777,684 | B1 * | 8/2004 | Volkov et al. ............ 250/341.1 |
| 7,358,890 | B2 * | 4/2008 | Price et al. .................... 342/82 |
| 7,601,958 | B2 * | 10/2009 | Daly ......................... 250/330 |
| 2008/0298640 | A1 * | 12/2008 | Reinpoldt, III ............ 382/107 |

\* cited by examiner

*Primary Examiner*—Yon Couso
(74) *Attorney, Agent, or Firm*—ShuffieldLowman; Matthew G. McKinney

(57) ABSTRACT

The present invention is an imaging system for detecting concealed objects on an individual. The imaging system includes an imaging zone that is illuminated with millimeter wave energy. A plurality of millimeter wave cameras are focused to fully surround the imaging zone and have the ability to detect millimeter wave frequencies reflected from the imaging zone. As an individual passes through the imaging zone the plurality of millimeter wave cameras detect concealed objects by identifying differences in the millimeter wave energy reflected by the individual's body and a concealed object. A composite image is generated by a central processing unit and displayed on a monitor showing the concealed object on the individual through optical contrast.

18 Claims, 4 Drawing Sheets

MULTIPLE CAMERA IMAGING METHOD AND SYSTEM FOR DETECTING CONCEALED OBJECTS

BACKGROUND OF THE INVENTION

1. Field of the Invention

The present invention relates generally to security systems, and more specifically to using multiple millimeter wave cameras to detect concealed objects on an individual.

2. Description of the Prior Art

Security systems can be found at transportation centers such as airports, train stations or at other public facilities such as courthouses, government buildings, or public schools. One of the principal concerns of operators of security systems is the need to protect security personnel and other individuals (e.g. the general public) in the course of conducting a search of a person for concealed objects. The concealed objects that present a danger are weapons, explosives, contraband and other similar items.

Prior art security systems include metal or chemical residue detectors that require security personnel to be in proximity of the individual. One or more security personnel are required to conduct a hands-on or "wand-based" scan of an individual for whom the metal or chemical residue detector has generated an alarm. An inherent deficiency of this type of security system is the fact that it exposes not only the security personnel to danger, but also other individuals (e.g., travelers in an airport) in the vicinity of the security system to the dangers posed by such concealed objects. Accordingly, there is a need in the relevant art for a security system that has the ability to perform from a stand-off perspective so that security personnel and innocent by-standers are not exposed to any potential threat or danger.

There is also a need in the art for an improved security system that is non-invasive to the individual being searched for concealed objects.

Another need exists in the art to provide an improved security system that provides synchronized images from all angles of an individual's body to locate concealed objects.

Another need exists in the art to provide an improved security system that is easy for security personnel to operate and to synchronize.

Another need exists in the art to provide an improved security system to identify non-metallic concealed objects on an individual such as explosives.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

The invention provides an imaging system for detecting concealed objects on an individual. The imaging system includes an imaging zone that is illuminated with millimeter wave energy; a plurality of millimeter wave cameras focused on the imaging zone that have the ability to detect millimeter wave frequencies reflected from the imaging zone; a plurality of video cameras focused on the imaging zone so that each video camera has a corresponding millimeter wave camera of the plurality of millimeter wave cameras focused on a substantially identical angle and perspective of the imaging zone; a means for electrically communicating between the plurality of video cameras, millimeter wave cameras and a central processing unit so that scanning of the individual within the imaging zone is simultaneous with the plurality of millimeter wave cameras and the plurality of video cameras; a millimeter wave receiver for receiving input signals received by the plurality of millimeter wave cameras to generate millimeter wave images; a video receiver for receiving input signals received by the plurality of video cameras to generate video images; a means for synchronizing the millimeter wave images with the video images to a substantially identical time base so that real-time composite images of the millimeter wave images and video images are generated; a means to detect a concealed object on an individual by identifying differences in the millimeter wave energy reflected by the individual and the concealed object received by the plurality of millimeter wave cameras; and a means for displaying the composite images on a video monitor showing the concealed object on the individual.

In accordance with the present invention, a multiple camera imaging method and system successfully addresses the risk to security personnel from dangerous concealed objects on an individual. The imaging system is operative to perform a full, surrounding field of observation of an individual for optical contrast-based information representative of the presence of one or more objects concealed on the person being searched. The ability of the multiple camera imaging system to conduct a complete search of the individual from a full, surrounding imaging perspective makes it unnecessary to place security personnel proximate to the individual during the search. Therefore, the individual can be readily physically isolated if a concealed object is detected. The isolation of the individual can be accomplished by a variety of means including hardened doors at the entrance and exit of the imaging system thereby avoiding potential danger to security personnel and others in the vicinity.

The imaging system includes a plurality of real time, millimeter wave imaging cameras that are deployed in a spatial 'cluster' about a prescribed imaging zone. The imaging zone comprises the area where the cameras are focused and an individual must pass through. In addition, the imaging system includes standard video cameras that produce continuous dynamic images.

The imaging zone is illuminated using one or more projection optics devices with low millimeter wave energy that is emitted from a natural source. For example, the natural source could be a temperature-controlled container of water. The millimeter wave cameras can then generate images representative of sensed differences or contrast in low millimeter wave energy (e.g. electromagnetic wave energy lying in the 80-100 GHz range) naturally emitted by the human body and low millimeter wave energy that is reflected by any object concealed on the individual being searched/imaged.

The millimeter wave contrast-based images are superimposed on the images of the person produced by the video cameras to realize a set of composite images. Accordingly, the composite image shows both the person being searched and also any concealed object(s) revealed by the contrast-based images produced by the millimeter wave imaging cameras.

The operations of both the video and millimeter wave cameras of the imaging system are temporally synchronized so that their respective images correspond to multiple images of the individual produced at the same instant in time. The imaging system generates a continuous, full, surrounding view of the individual being searched. In the preferred embodiment, the composite images from the various cameras are coupled by way of a digital communication link to a computer workstation for display to security personnel. The workstation display and the cameras of the imaging system are synchronized to a common time base.

The security personnel at the workstation may execute a "start" command to control the operation of each camera. A start scan command is effective to cause each camera to begin scanning at an absolute time. The cameras begin operation substantially simultaneously since they are synchronized to the same time base. Each image frame produced by a respective camera includes both a timestamp and a sequence number. This information enables the workstation computer to determine whether the cameras are synchronized to within a prescribed tolerance or to take corrective action.

A "pause" command may be used selectively to provide adjustment of the operation of the cameras. For example, a pause command can be executed to the other cameras to delay their operations sufficiently to synchronize them with the lagging camera if the workstation computer determines that one of the cameras is not synchronized. Accordingly, the pause command will result in all cameras of the imaging system being synchronized again.

It is therefore a primary object of the invention to provide a security system that generates synchronized images from all angles of an individual's body to locate concealed objects.

Another very important object of the invention is to provide a security system that has the ability to successfully perform without exposing security personnel and innocent by-standers to any potential threat or danger from a concealed object.

Another important object of the invention is to provide a security system that is non-invasive to the individual being searched for concealed objects.

Still another very important object of the invention is to provide an improved security system that is easy for security personnel to operate and to synchronize.

Another object of the invention is to provide an improved security system to identify non-metallic concealed objects on an individual such as explosives.

These and other important objects, advantages, and features of the invention will become clear as this description proceeds.

The present invention, accordingly, comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
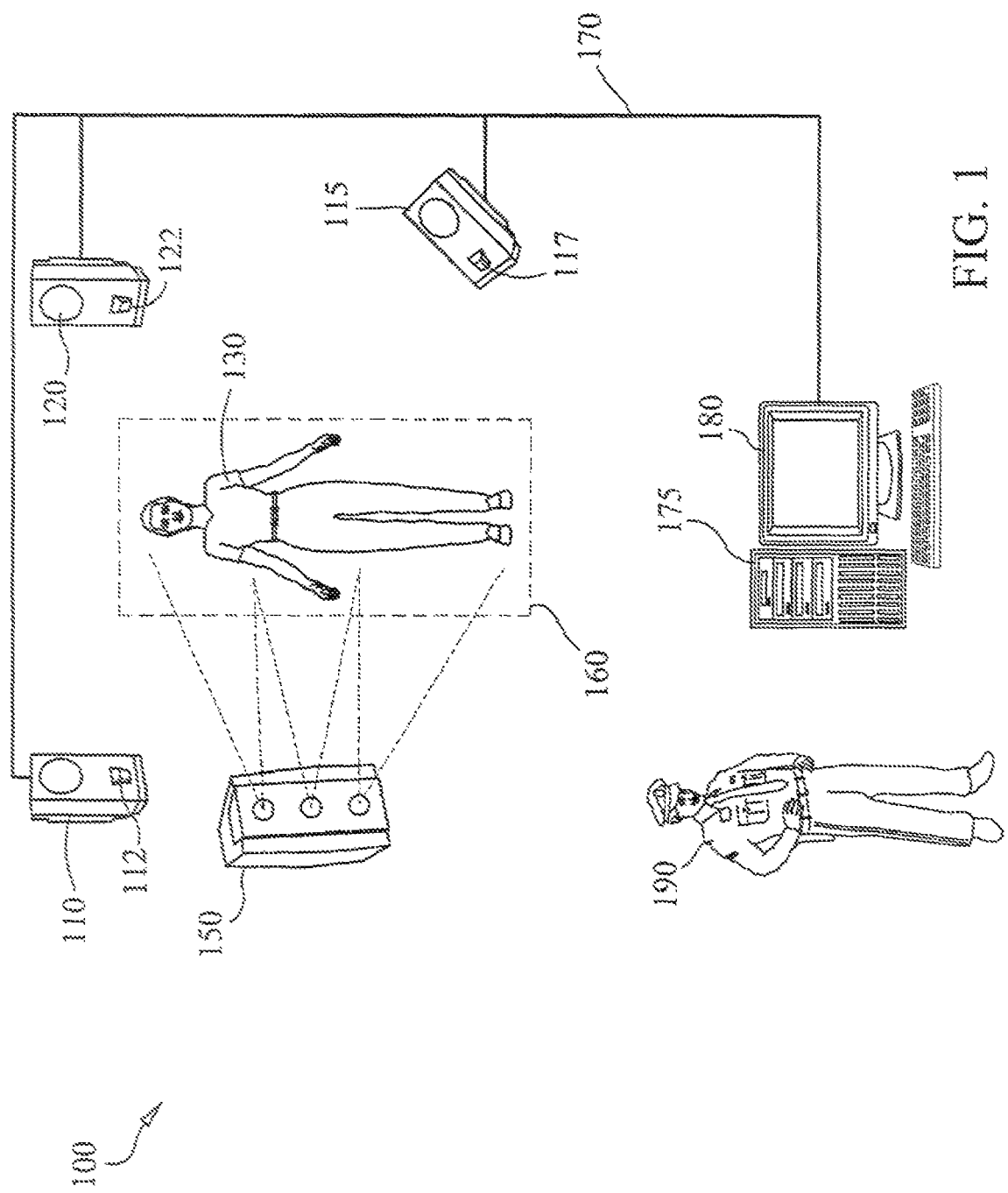
FIG. 1 diagrammatically illustrates an embodiment of the present invention.

FIG. 1 diagrammatically illustrates the preferred embodiment of the present invention. As shown therein, the imaging system 100 includes a plurality of millimeter wave cameras 110, 115, 120. The millimeter wave cameras 110, 115, 120 are spatially deployed relative to a prescribed imaging zone 160 through which an individual 130 to be searched must pass, so that the cameras may be considered to be arranged in a completely circumscribed fashion about that imaging zone 160. It should be noted that the invention is not limited to the three millimeter wave cameras of the illustrated example, or any particular number. What is necessary is that the number of millimeter wave cameras deployed about the imaging zone 160 is sufficient to perform a full, surrounding field of observation of a person 130 within the imaging zone 160.

The millimeter wave cameras 110, 115, 120 are detection devices that are operative to detect differences or contrast between millimeter wave energy (e.g. electromagnetic wave energy lying in the 80-100 GHz range) that is naturally emitted by the body of an individual 130 present in the imaging zone 160, and millimeter wave energy that is reflected by any object 250 concealed on that individual 130. The imaging zone 160 is illuminated by one or more projection optics device 150 with millimeter wave energy that is emitted from one or more appropriately situated natural sources such as a temperature-controlled container of water (not shown).

Each millimeter wave camera 110, 115, 120 further comprises a standard video camera 112, 117, 122, respectively, that is operative to produce continuous dynamic images of the imaging zone 160 and whatever passes through the imaging zone 160 on a real-time basis.

The millimeter wave contrast-based images are superimposed or overlaid on the images of the individual produced by the video cameras 112, 117, 122 to realize a set of composite images. The composite images show both the individual being searched and also any concealed object(s) 250 revealed by the contrast-based images that were generated in conjunction with the millimeter wave cameras 110, 115, 120.

Figure 2:
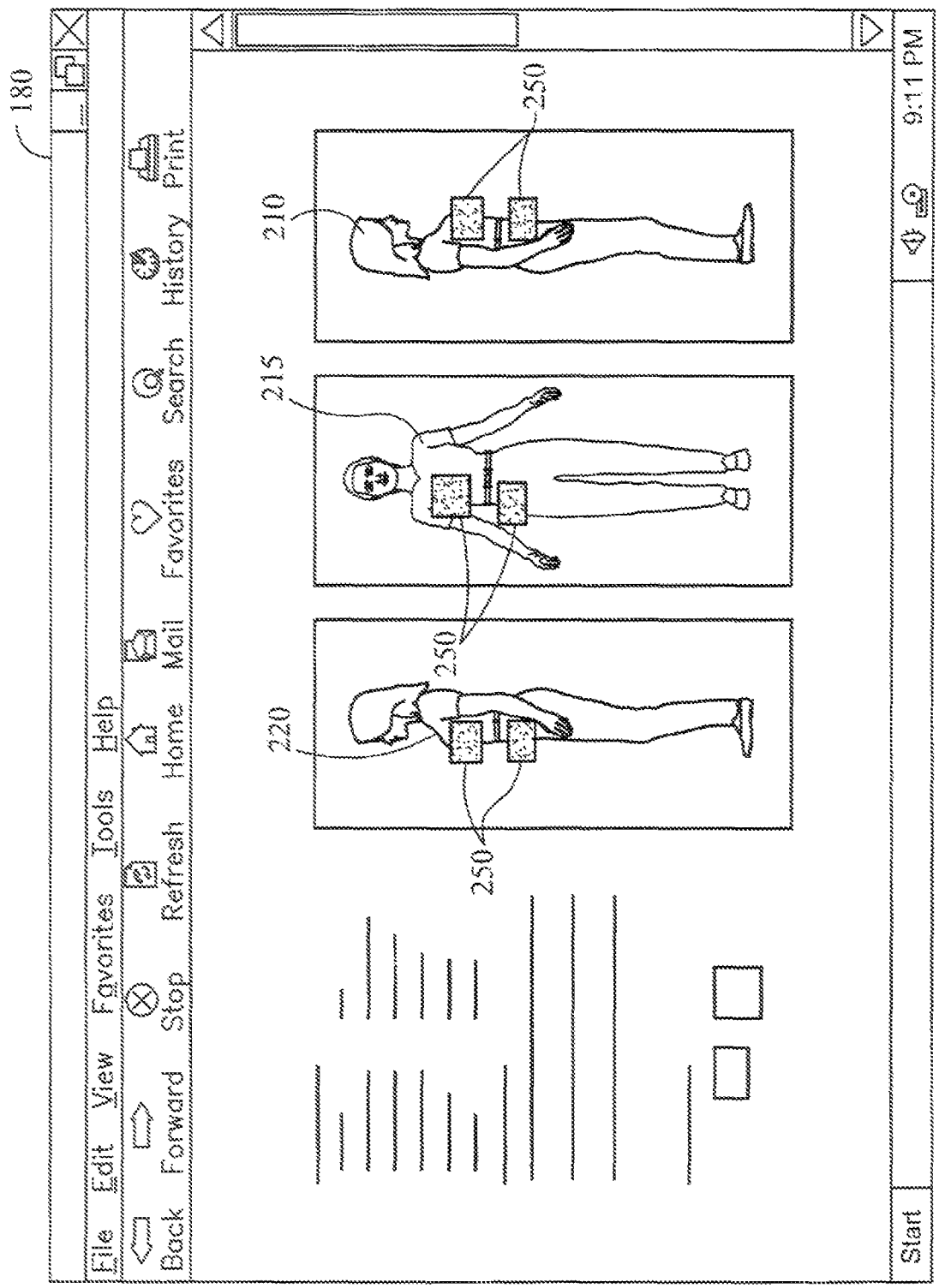
FIG. 2 shows conceptual views of two-dimensional composite images generated by the present invention.
Figure 3:
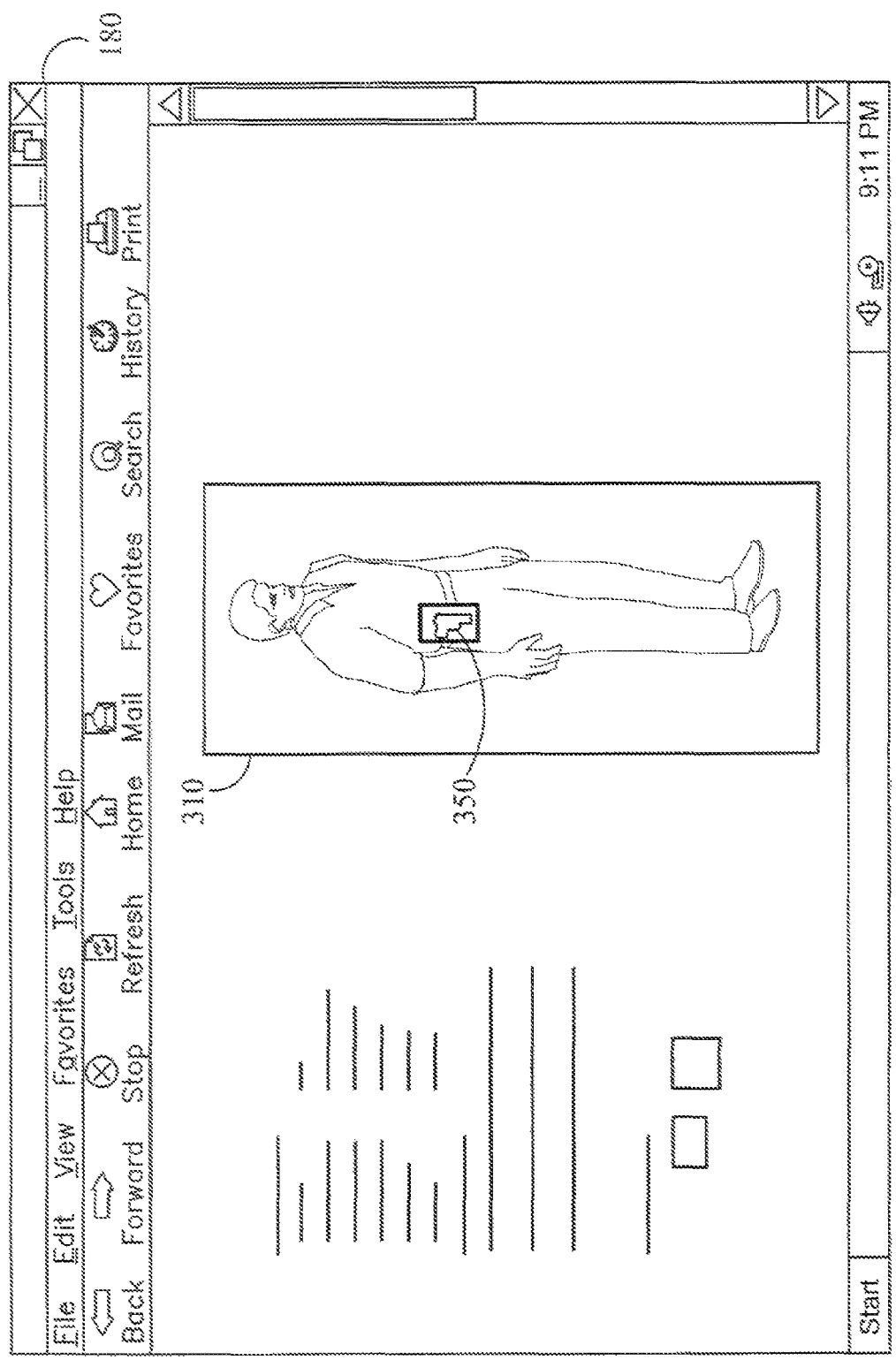
FIG. 3 shows a conceptual view of a three-dimensional composite image generated by the present invention.

The operation of the millimeter wave and standard video cameras are mutually synchronized so that their respective images correspond to multiple images of the individual 130 produced at the same instant in time, thereby realizing a continuous, full, surrounding view of the individual 130 being searched. The composite images from the various cameras are coupled by way of electrical communication links 170 (such as a switched Ethernet local area network (LAN)) to a security central processing unit (CPU) 175 for display on a video monitor 180. The respective images produced by the system 100 may be displayed as two-dimensional images as shown in FIG. 2 or they may be processed for display as a composite three-dimensional images as shown in FIG. 3.

Each millimeter wave and video camera contains an embedded processor that controls its internal camera circuitry, monitors environmental conditions, and assembles data into time-stamped, sequence-numbered frames, which are then received as input by the CPU 175 for processing and display. The security personnel 190 may manually enter start/stop commands by way of the CPU 175 to control the operation of each camera, and the CPU 175 synchronizes the start of a scan for each camera. CPU 175 receives input data streams from the cameras, checks for synchronization, and then displays the composite images on monitor 180.

As noted above, monitor 180 and the cameras are synchronized to a common time base, which is provided on a continuous basis on the Ethernet LAN. Communications are conducted using a prescribed protocol, such as, but not limited to network time protocol (NTP), or a custom protocol. When CPU 175 issues a start scan command to each camera, the command is effective to cause each camera to begin scanning at an absolute time, where that time is some prescribed time (delayed by one or two seconds) from the time of issuing the command. Since all cameras are synchronized to the same time base, they begin operation substantially simultaneously.

Each image frame produced by a respective camera includes both a timestamp and a sequence number. This information enables the CPU 175 to determine whether the cameras are synchronized to within a prescribed tolerance (e.g., on the order of fifty milliseconds, at four frames per second), and take corrective action, where necessary. In some instances, a "pause" command may be generated. For example, if the CPU 175 determines that one of the cameras is lagging behind the other cameras more than a prescribed acceptable delay, it may issue a pause command to the other cameras of the imaging system 100. This will briefly delay their operations sufficiently so that all cameras of the imaging system 100 are again synchronized.

Referring now to FIG. 2 shows a conceptual view of monitor 180 such that composite two-dimensional images 210, 215, 220 of an individual 130 are displayed. Also shown on monitor 180 are concealed objects 250. Two concealed objects 250 are shown to illustrate the output of the imaging system 100. CPU 175 processes input from millimeter wave cameras 110, 115, 120 to detect differences in millimeter wave energy between individual 130 and any concealed objects 250 and superimposes that contrast on the image generated by respective video cameras 112, 117, 122 dependent on the desired view.

FIG. 3 shows a conceptual three-dimensional view of individual 130 on monitor 180 such that a composite image of a targeted individual is displayed. A concealed object 350 on the individual is displayed on monitor 180 readily visible to security personnel 190. Image 310 can be fully rotated by security personnel 190 so that an individual is visible from multiple perspectives for locating concealed objects.

Figure 4:
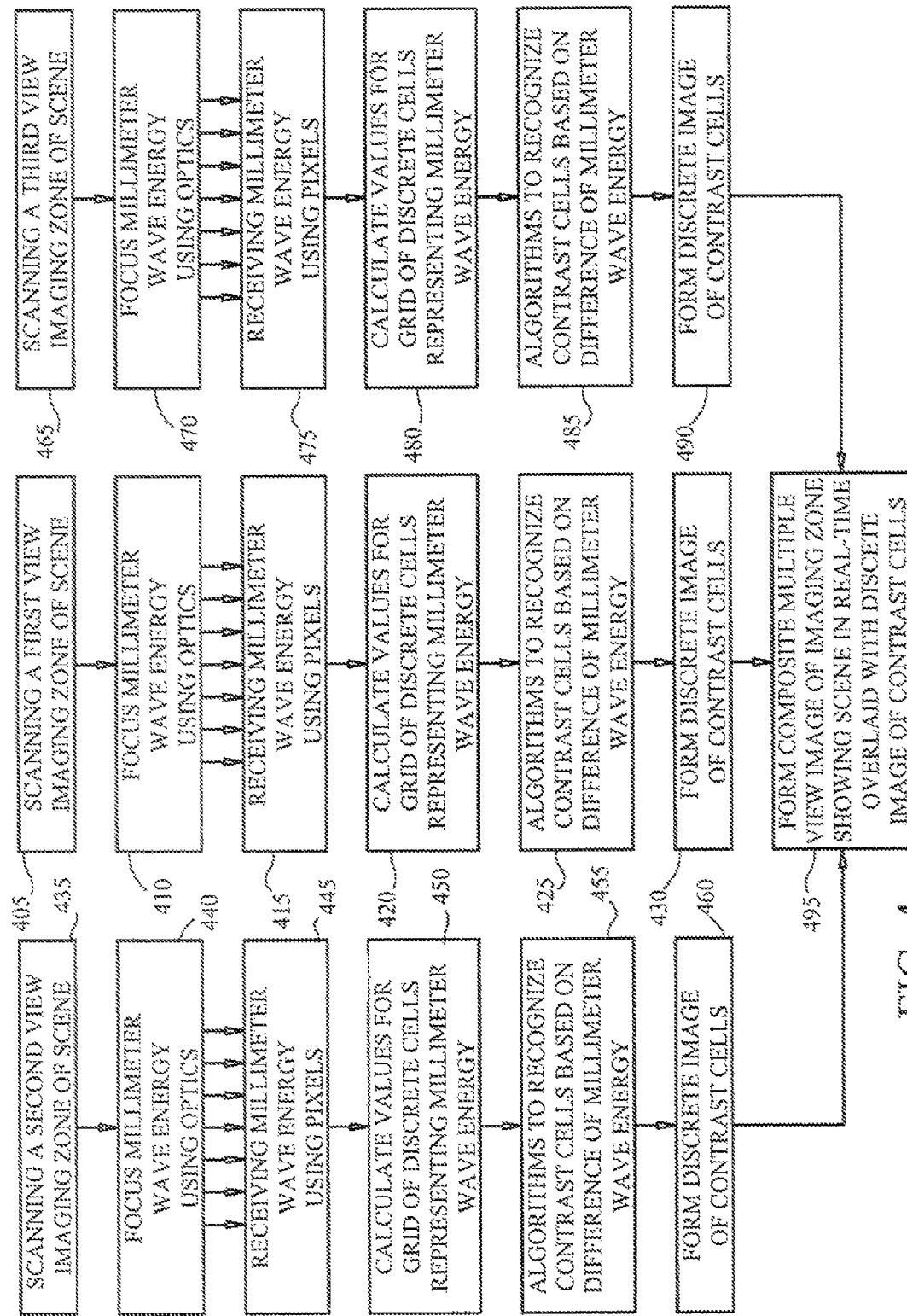
FIG. 4 provides a flowchart illustrating logic that may be used to implement a multiple camera imaging system according to preferred embodiments of the present invention.

Referring now to FIG. 4 shows a flow chart illustrating logic that may be used to implement preferred embodiments of the method of the present invention. As shown in FIG. 4, multiple views of an imaging zone are scanned 405, 435, 465. The scanning process comprises a first view 405, which is typically a frontal view, a second view 435 and opposing third view 465 to triangulate the imaging zone 160. As each respective view is scanned, millimeter wave energy is focused using optics 410, 440, 470 onto an array of pixels adapted to receive millimeter wave energy 415, 445, 475. Each array of pixels sends signals to CPU 175 having algorithms to process the signals 425, 455, 485 which recognizes and calculates differences of millimeter wave energy. A discrete image of contrast cells is formed and generates a millimeter wave image 430, 460, 490. Each video image from the respective view is overlaid by the respective discrete image of contrast cells. In the preferred embodiment, only the area of the millimeter wave image recognized as a possible location of a concealed object on an individual overlays the real-time video image forming and generating a composite image 495.

Readily understandable diagrams of the present invention described herein illustrate the configurations of the imaging and video processing circuits and components and the manner in which they are interfaced with conventional display equipment. The diagrams show those specific details that are pertinent to the present invention so as not to obscure the disclosure with details, which will be readily apparent to those skilled in the art of having the benefit of the description herein. Thus, the diagrams shown in the drawings are primarily intended to show the various components of the invention in convenient functional groupings, so that the present invention may be more readily understood.

Further, the present invention has been described with reference to flow diagrams and/or block diagrams of methods according to preferred embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

Accordingly, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall there between.

Now that the invention has been described,
What is claimed is:

1. A method for detecting concealed objects on an individual using an optical contrast based imaging system, the method comprising:
   illuminating an imaging zone with millimeter wave energy;
   providing a plurality of millimeter wave cameras focused on the imaging zone that have the ability to detect millimeter wave frequencies reflected from the imaging zone;
   providing a plurality of video cameras focused on the imaging zone so that each video camera has a corresponding millimeter wave camera of the plurality of millimeter wave cameras focused on a substantially identical angle and perspective of the imaging zone;
   scanning the imaging zone simultaneously with the plurality of millimeter wave cameras and the plurality of video cameras;
   electrically communicating between the plurality of video cameras, millimeter wave cameras and a central processing unit;
   receiving input signals from the plurality of millimeter wave cameras to generate millimeter wave images;
   receiving input signals from the plurality of video cameras to generate video images;
   synchronizing the millimeter wave images with the video images to a substantially identical time base using the central processing unit;
   generating real-time composite images of the millimeter wave images and video images using the central processing unit;
   detecting a concealed object on an individual using the central processing unit by identifying differences in the millimeter wave energy reflected by the individual and the concealed object; and
   displaying the composite images on a video monitor that is in electrical communication with the central processing unit so that the concealed object is visually shown on the composite images of the individual.

2. The method of claim 1 further comprises the step of isolating an individual who is identified as having a concealed object so that security personnel and other innocent individuals are not in danger from the identified threat.

3. The method of claim 1 wherein security personnel manually accomplish the synchronizing of the millimeter wave images and video images using the central processing unit.

4. The method of claim 1 further comprising the step of time stamping each image frame of the millimeter wave images and video images.

5. The method of claim 1 wherein the imaging zone is a fully surrounding field of observation of an individual.

6. The method of claim 1 further comprising the step of providing a sequence number for each image frame of the millimeter wave images and video images.

7. The method of claim 1 wherein the synchronization is provided on a continuous basis on an Ethernet LAN.

8. The method of claim 1 wherein the synchronization is to within a prescribed tolerance of fifty milliseconds at four frames per second.

9. The method of claim 1 wherein the electrical communications are conducted using a prescribed network time protocol.

10. An imaging system for detecting concealed objects on an individual, the system comprising:

an imaging zone that is illuminated with millimeter wave energy;

a plurality of millimeter wave cameras focused on the imaging zone that have the ability to detect millimeter wave frequencies reflected from the imaging zone;

a plurality of video cameras focused on the imaging zone so that each video camera has a corresponding millimeter wave camera of the plurality of millimeter wave cameras focused on a substantially identical angle and perspective of the imaging zone;

a means for electrically communicating between the plurality of video cameras, millimeter wave cameras and a central processing unit so that scanning of the individual within the imaging zone is simultaneous with the plurality of millimeter wave cameras and the plurality of video cameras;

a millimeter wave receiver for receiving input signals received by the plurality of millimeter wave cameras to generate millimeter wave images;

a video receiver for receiving input signals received by the plurality of video cameras to generate video images;

a means for synchronizing the millimeter wave images with the video images to a substantially identical time base so that real-time composite images of the millimeter wave images and video images are generated;

a means to detect a concealed object on an individual by identifying differences in the millimeter wave energy reflected by the individual and the concealed object received by the plurality of millimeter wave cameras; and a means for displaying the composite images on a video monitor showing the concealed object on the individual.

11. The system of claim 10 further comprising a means to isolate an individual who is identified as having a concealed object so that security personnel and other innocent individuals are not in danger from the identified threat.

12. The system of claim 10 wherein the means for synchronizing the millimeter wave images and video images using the central processing unit is accomplished manually.

13. The system of claim 10 wherein each image frame of the millimeter wave images and video images is time stamped.

14. The system of claim 10 wherein the imaging zone is a fully surrounding field of observation of an individual.

15. The system of claim 10 wherein each image frame of the millimeter wave images and video images is numbered in sequence.

16. The system of claim 10 wherein the means for synchronization is provided on a continuous basis on an Ethernet LAN.

17. The system of claim 10 wherein the means for synchronization is to within a prescribed tolerance of fifty milliseconds at four frames per second.

18. The system of claim 10 wherein the means for electrical communicating uses a prescribed network time protocol.

* * * * *